United States Patent
Edelson et al.

(10) Patent No.: US 12,010,026 B2
(45) Date of Patent: Jun. 11, 2024

(54) MANAGING COMPUTER NETWORK TRAFFIC BASED ON WEATHER CONDITIONS

(71) Applicant: INTERNATIONAL BUSINESS MACHINES CORPORATION, Armonk, NY (US)

(72) Inventors: Hayden Edelson, New York, NY (US); Ardelia Ayanna Killings, Bowie, MD (US); Mairead O'Neill, Stoneham, MA (US); Thai Hong Quach, San Jose, CA (US); Zachary A. Silverstein, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 17/654,094

(22) Filed: Mar. 9, 2022

(65) Prior Publication Data
US 2023/0291691 A1    Sep. 14, 2023

(51) Int. Cl.
*H04L 47/22*    (2022.01)
*H04L 43/04*    (2022.01)
(Continued)

(52) U.S. Cl.
CPC ............ *H04L 47/22* (2013.01); *H04L 43/04* (2013.01); *H04L 47/2475* (2013.01); *H04L 47/28* (2013.01); *H04L 47/30* (2013.01)

(58) Field of Classification Search
CPC ......... H04L 43/04; H04L 47/28; H04L 47/30; H04L 47/2475
See application file for complete search history.

(56) References Cited

U.S. PATENT DOCUMENTS 6,058,260 A * 5/2000 Brockel .............. H04W 84/042
                                                  703/4
9,483,338 B2 * 11/2016 Bhalla ................... H04L 41/147
(Continued)

OTHER PUBLICATIONS

Amadeo et al., "Diversity-improved caching of popular transient contents in Vehicular Named Data Networking", Elsevier, Computer Networks, vol. 184, Jan. 15, 2021, 107625, https://www.sciencedirect.com/science/article/abs/pii/S1389128620312548?via%3Dihub, 3 pages. Abstract Only.
(Continued)

*Primary Examiner* — Melanie Jagannathan
(74) *Attorney, Agent, or Firm* — Kristofer Haggerty

(57) ABSTRACT

A computer-implemented method, a computer system and a computer program product manage network throughput based on weather conditions. The method includes identifying a weather condition from a weather forecast. The weather condition includes a geographic area and a time period. The method also includes collecting historical data associated with the network. The historical data includes the network throughput during a past event. The method further includes determining that the weather condition will lower the network throughput below a threshold based on the network throughput during the past event. Lastly, the method includes dynamically creating software application containers on a server at a time prior to the time period of the weather condition. The software application containers are accessed by a user computing device within the geographic area.

12 Claims, 5 Drawing Sheets

(51) Int. Cl.
*H04L 47/2475* (2022.01)
*H04L 47/28* (2022.01)
*H04L 47/30* (2022.01)

(56) References Cited

U.S. PATENT DOCUMENTS

| | | | | |
|---|---|---|---|---|
| 9,692,644 | B2* | 6/2017 | Hui | H04L 41/0836 |
| 9,843,914 | B1* | 12/2017 | Rao | H04W 4/90 |
| 10,616,314 | B1* | 4/2020 | Plenderleith | H04L 67/1027 |
| 11,863,244 | B1* | 1/2024 | Collins | H04W 24/08 |
| 2005/0273281 | A1* | 12/2005 | Wall | G06Q 50/06 |
| | | | | 702/60 |
| 2006/0176817 | A1* | 8/2006 | Liu | G08G 1/096827 |
| | | | | 370/235 |
| 2009/0193482 | A1* | 7/2009 | White | H04N 21/6338 |
| | | | | 725/110 |
| 2011/0314145 | A1* | 12/2011 | Raleigh | H04W 48/16 |
| | | | | 709/224 |
| 2013/0122894 | A1* | 5/2013 | Carlin | H04L 41/147 |
| | | | | 455/423 |
| 2015/0256581 | A1* | 9/2015 | Kolhi | H04L 65/80 |
| | | | | 709/219 |
| 2017/0091876 | A1* | 3/2017 | Bostick | G06Q 50/01 |
| 2018/0090929 | A1* | 3/2018 | Roberts | G05B 15/02 |
| 2018/0145870 | A1 | 5/2018 | Medina | |
| 2018/0309986 | A1 | 10/2018 | Edpalm | |
| 2019/0213182 | A1* | 7/2019 | Rapanen | H04L 9/3297 |
| 2020/0266880 | A1* | 8/2020 | Gayrard | H04W 40/22 |
| 2021/0263186 | A1* | 8/2021 | Thompson | G01W 1/10 |
| 2021/0374270 | A1* | 12/2021 | Schmale | G06Q 40/08 |
| 2022/0239578 | A1* | 7/2022 | Raleigh | H04L 43/026 |
| 2022/0294816 | A1* | 9/2022 | Martin | G06F 16/9038 |
| 2022/0383728 | A1* | 12/2022 | Brown | H04L 67/12 |
| 2023/0097373 | A1* | 3/2023 | D'Andre | G08G 1/0133 |
| | | | | 701/117 |
| 2023/0236977 | A1* | 7/2023 | Dev | G06N 3/0464 |
| | | | | 711/118 |
| 2023/0262491 | A1* | 8/2023 | Seck | H04L 41/0663 |
| | | | | 370/252 |
| 2024/0006883 | A1* | 1/2024 | Afsharinejad | G06N 20/00 |

OTHER PUBLICATIONS

Disclosed Anonymously, "Change Storage Caching Algorithm or Size Based on Local Weather Conditions" IP.com, IP.com No. IPCOM000203443D, IP.com Publication Date: Jan. 25, 2011 pp. 1-2.

Dokic et.al., "Spatially Aware Ensemble-Based learning to Predict Weather-Related Outages in Transmission", Semantic Scholar, https://par.nsf.gov/servlets/purl/10110812, Jan. 8, 2019, pp. 1-12.

Ekanadham, "Using Machine Learning to Improve Streaming Quality at Netflix", Netflix Technology Blog, https://netflixtechblog.com/using-machine-learning-to-improve-streaming-quality-at-netflix-9651263ef09f, Mar. 22, 2018, 7 Pages.

IBM, "Advancing weather science with accurate forecasting products & technology for businesses everywhere", The Weather Company, an IBM Business | Accurate Weather Technolog . . . , https://www.ibm.com/weather, Accessed on Dec. 15, 2021, pp. 1-7.

IBM, "The Weather Company, an IBM Business", https://www.IBM.com/case-studies/the-weather-company-hybrid-cloud-kubernetes, Accessed on Dec. 15, 2021, pp. 1-13.

Mell et al., "The NIST Definition of Cloud Computing", National Institute of Standards and Technology, Special Publication 800-145, Sep. 2011, 7 pages.

Morris, "Incorporating weather data into IoT is a game-changer", IBM Business Operations Blog, https://www.ibm.com/blogs/internet-of-things/incorporating-weather-data-into-iot/, Nov. 16, 2016, pp. 1-8.

* cited by examiner

MANAGING COMPUTER NETWORK TRAFFIC BASED ON WEATHER CONDITIONS

BACKGROUND

Embodiments relate generally to computer networks, and more specifically, to managing network traffic based on weather conditions.

Weather may be an important driver in the everyday choices that may be made by many people. In the present environment where much personal interaction with the world may be online, weather conditions may be a major factor in determining computer network bandwidth, or throughput, requirements. Adverse weather conditions may drive more users to consume data in homes or offices and drastically increase network traffic, or the requirement for throughput, for the duration of an adverse weather event. As a result, the weather forecast in a geographic area may be an important predictor of the computer network throughput requirements in the geographic area. In turn, the attributes of the computer network may be adjusted based on the results of any prediction of weather conditions.

SUMMARY

An embodiment is directed to a computer-implemented method for managing network throughput based on weather conditions. The method may include identifying a weather condition from a weather forecast, where the weather condition includes a geographic area and a time period. The method may also include collecting historical data associated with the network, where the historical data includes the network throughput during a past event. The method may further include determining that the weather condition will lower the network throughput below a threshold based on the network throughput during the past event. Lastly, the method may include dynamically creating software application containers on a server at a time prior to the time period of the weather condition, where the software application containers are accessed by a user computing device within the geographic area.

In an embodiment, the method may include automatically copying a data file stored within the geographic area to a remote server outside the geographic area at the time prior to the time period of the weather condition.

In another embodiment, the method may include automatically creating a file buffer on the remote server outside the geographic area at the time prior to the time period of the weather condition.

In a further embodiment, the method may include automatically copying the data file stored within the geographic area to the user computing device at the time prior to the time period of the weather condition.

In yet another embodiment, the method may include automatically creating a local file buffer on the user computing device at the time prior to the time period of the weather condition.

In another embodiment, the method may include determining whether the user computing device is allowed to access predetermined content. In this embodiment, the method may also include allowing the user computing device to access the predetermined content during the time period of the weather condition when the user computing device is not allowed to access to the predetermined content.

In yet another embodiment, the method may include identifying preferred content on the server from a user history. In this embodiment, the method may also include copying the preferred content from the server to the user computing device at the time prior to the time period of the weather condition.

In a further embodiment, a machine learning classification model that predicts an effect of weather on network throughput may be used to determine that the weather condition will lower the network throughput below the threshold.

In addition to a computer-implemented method, additional embodiments are directed to a system and a computer program product for managing network throughput based on weather conditions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Computer networks may be geographically distributed collections of nodes interconnected by communication links and segments for transporting data between end nodes, such as personal computers and workstations, or other devices, such as mobile devices, e.g., tablets and smart phones, etc. Many types of networks may be available, ranging from local area networks (LANs) to wide area networks (WANs). LANs may connect the nodes over dedicated private communication links located in the same general physical location, such as a building or campus. WANs, on the other hand, may connect geographically dispersed nodes over long-distance communication links, using technologies such as common carrier telephone lines, optical fiber links, synchronous optical networks (SONET), synchronous digital hierarchy (SDH) links, or Powerline Communications (PLC) such as IEEE 61334, IEEE P1901.2, and others.

At the same time, weather may be a core driver of human behavior. The weather may affect the daily choices that can be made, for example whether to dress warm or cool, or enjoying activities inside or outside. As a result, the weather can also affect our computers, televisions, cell phones and other electronic equipment, as well as the computer networks to which these devices connect, not just from the weather directly but also due to individual behaviors such as more people staying inside. If more people are forced indoors, this may have a severe adverse effect on the throughput of the network, or the amount of bandwidth available to each individual computing device. Therefore, it may be advantageous to use a method that can understand and predict an effect on computer network components and infrastructure based on a weather forecast. Such a method may predictively cache web content based on real world weather patterns and may also provide customers consistently good service and additional space on the network and could save organizations time and money by avoiding potential data loss and damage to the servers and systems. In addition, the technology of computer networks may be improved and operate more efficiently if the hardware and software deployed in the network had a better understanding of the effects of weather conditions on network performance and also had the ability to predictively adapt to weather conditions that may be experienced.

Figure 1:
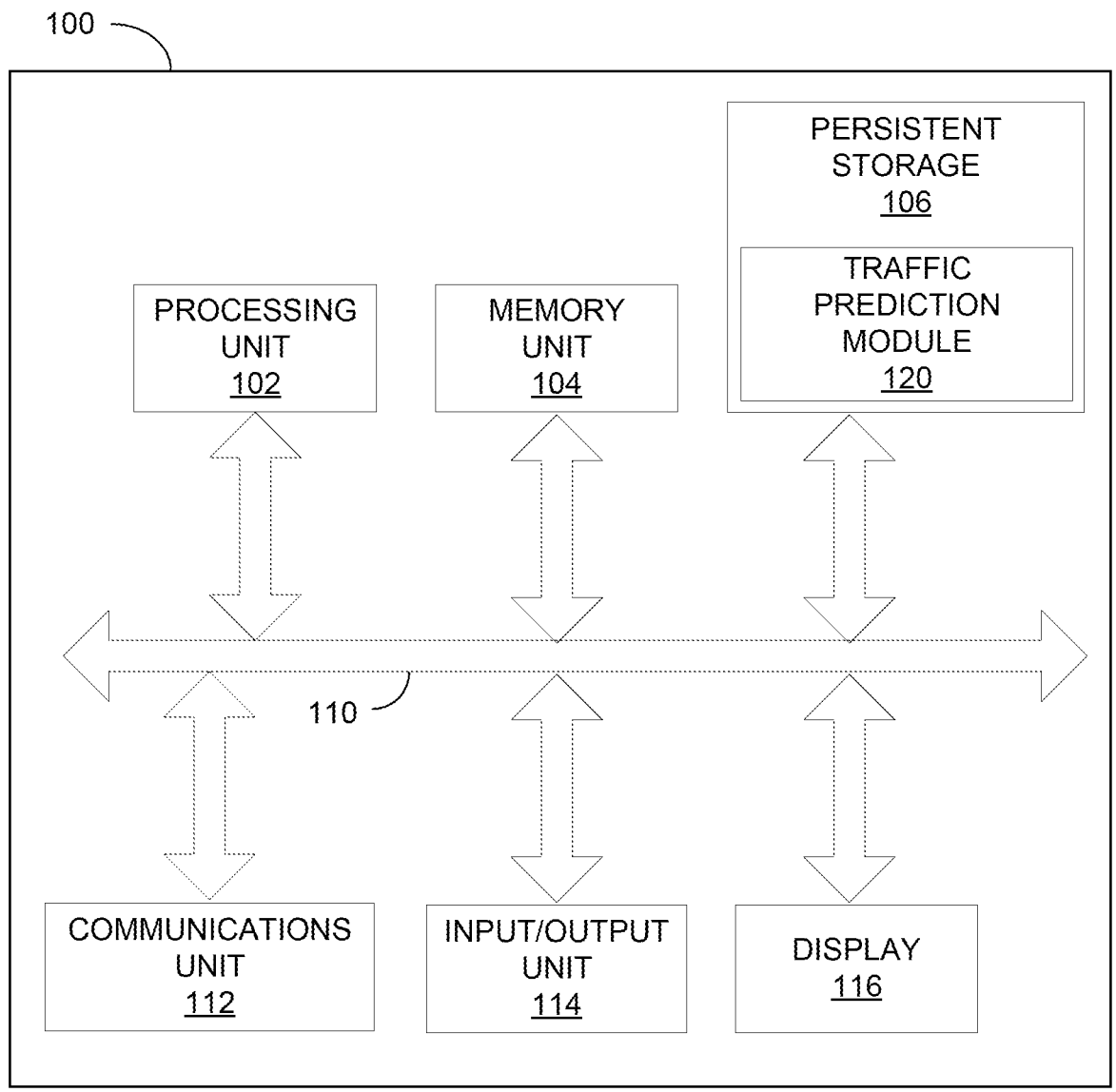
FIG. 1 depicts a block diagram of an example computer system in which various embodiments may be implemented.
Figure 2:
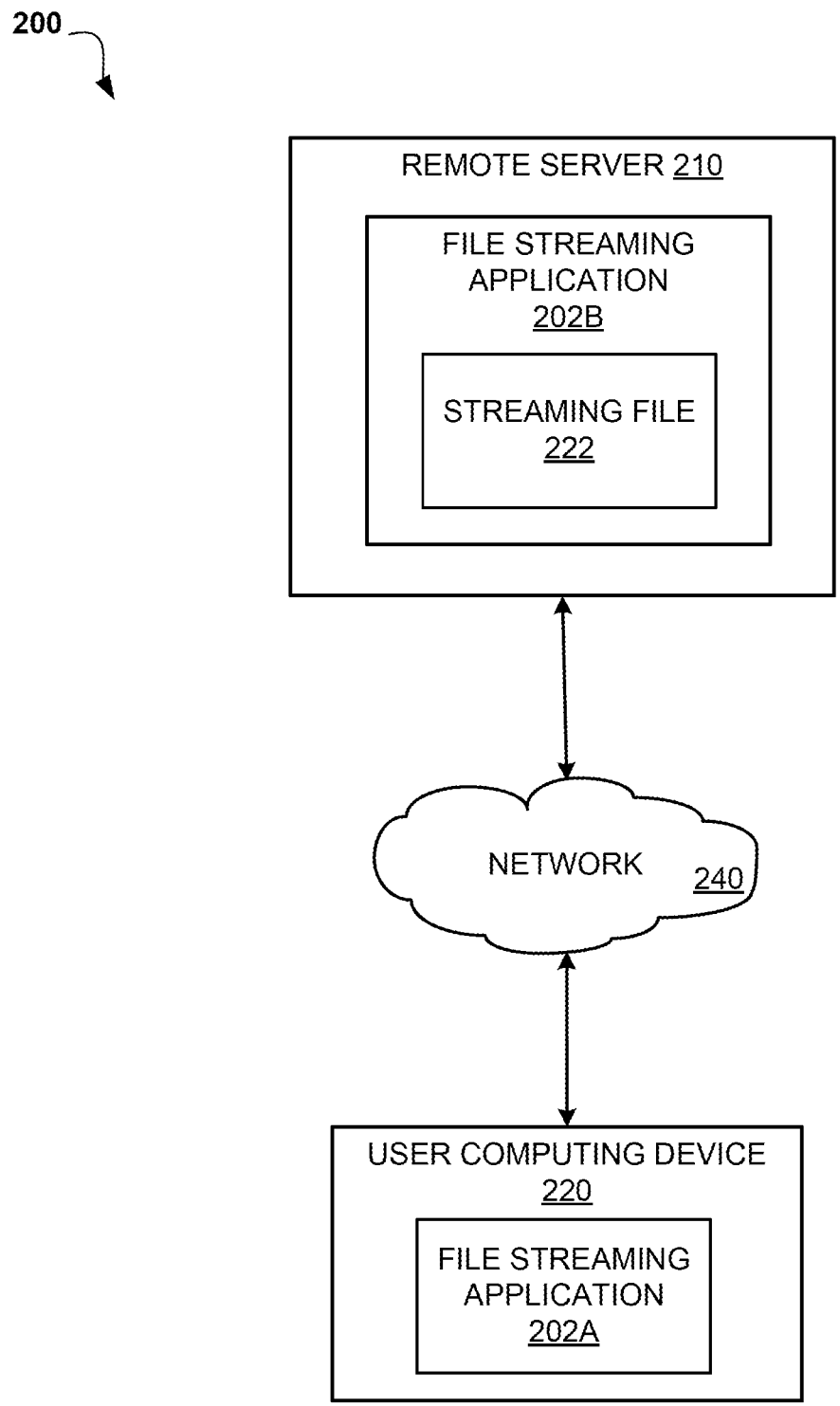
FIG. 2 depicts a block diagram of a computing environment that may be used for streaming a file over a network for use at a computing device, according to an exemplary embodiment.

Referring to FIG. 1, a block diagram is depicted illustrating a computer system 100 which may be embedded in the user computing device 220 or remote server 210 depicted in FIG. 2 in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements.

As shown, a computer system 100 may include a processor unit 102, a memory unit 104, a persistent storage 106, a communications unit 112, an input/output unit 114, a display 116, and a system bus 110. Computer programs such as traffic prediction module 120 may be typically stored in the persistent storage 106 until they are needed for execution, at which time the programs may be brought into the memory unit 104 so that they can be directly accessed by the processor unit 102. The processor unit 102 may select a part of memory unit 104 to read and/or write by using an address that the processor unit 102 may give to the memory unit 104 along with a request to read and/or write. Usually, the reading and interpretation of an encoded instruction at an address may cause the processor unit 102 to fetch a subsequent instruction, either at a subsequent address or some other address. The processor unit 102, memory unit 104, persistent storage 106, communications unit 112, input/output unit 114, and display 116 may interface with each other through the system bus 110.

Examples of computing systems, environments, and/or configurations that may be represented by the data processing system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. As shown in FIG. 2, the traffic prediction module 120 in a user computing device 220 or remote server 210 may communicate with external computers via a network (for example, the Internet, a local area network or other wide area network) and respective network adapters or interfaces, e.g., communications units 112. From the network adapters or interfaces, the traffic prediction module 120 may be loaded into the respective persistent storage 106.

It should also be noted that any software loaded and running within the computer system 100 may operate in a container environment, where software applications may be broken down into modules and run in a decentralized way. A computer system 100, through operating system software, may add or remove containers for software applications such that those applications may run more efficiently and smoothly. The management of containers may be an important way for a computing system 100 to manage resources related to processor and memory and also changes to performance in a network to which the computing system 100 may connect.

Referring to FIG. 2, a block diagram of an example networked computing environment 200 that may be used to implement some of the processes described herein is depicted, according to an embodiment. In this example, network environment 200 may indicate a service that implements file streaming application 230A, 230B on remote server 210 and user computing device 220, which may both include computer system 100, and provides file streaming services to users via a network 240. Non-limiting examples of user computing devices 220 include desktop computers, laptop computers, smart phones, tablet computers, and other handheld computing devices.

File streaming application 230A, 230B represents a service that may coordinate item selection, download and playback between remote server 210 and client device 220. File streaming application 230A, 230B is depicted in FIG. 2 as discrete blocks within the remote server 210 and client device 220. However, in some embodiments, the file streaming application 230A, 230B may operate fully within the remote server 210, fully within the user computing device 220 or partially on each end of the link.

In addition, although only one client device is depicted, a user may own and operate more or less devices that may wish to stream files. Similarly, although only a single remote server 210 is depicted, the entity that owns and operates remote server 210 may operate multiple devices, each of which may provide the same service or may operate together to provide media application 230B to user computing device 220. Only one of each is shown for the sake of simplicity.

In the example of FIG. 2, the user computing device 220 may be configured to communicate with the remote server 210 via the communication network 240 and coordinated by file streaming application 230A. A streaming file 222 may be downloaded from the remote server 210 and stored in the client device 220, where the streaming file may be used. However, one of ordinary skill in the art will recognize that it is not necessary for the streaming file 222 to be downloaded to the client device and may also be streamed over the network 240. In this process, a partial download of streaming file 222 may be done by user computing device 220 such that a portion of the file may be stored at user computing device 220 for access by file streaming application 202A. This may be known as buffering and the storage that may be created and used may be known as a file buffer. Such buffering may be done at any device within the network that may be accessed and managed by file streaming application 202A, 202B. Buffering of streaming file 222 may allow for more efficient management of file streaming by reducing the requirement to access the network for retrieving the file and enable more local processing of streaming files.

The traffic prediction module 120, shown in FIG. 1 as part of computing system 100, may operate in tandem with the file streaming application 202A on the user computing device 220 in the configuration shown in FIG. 2. The module may be discrete software that is separately loaded into the computing device or may be embedded in other applications loaded and running on the user computing device 220 or host server 210, including file streaming application 202A, 202B. It will be appreciated by one of ordinary skill in the art that while the traffic prediction module 120 operates at computing devices within a given network, it is not required that the software is physically loaded or installed on hardware within the network but may be on any server accessible from the network, including within the cloud.

As will be discussed with reference to FIGS. 4 and 5, networked computing environment 200 may also operate in a cloud computing service model, such as Software as a Service (SaaS), Platform as a Service (PaaS), or Infrastructure as a Service (IaaS). The cloud server 210 that is shown, along with any other servers comprising the networked computing environment 200, may also be located in a cloud computing deployment model, such as a private cloud, community cloud, public cloud, or hybrid cloud.

The communication network 240 may include various types of communication networks, such as a wide area network (WAN), local area network (LAN), a telecommunication network, a wireless network, a public switched network and/or a satellite network. The communication network 240 may include connections, such as wire, wireless communication links, or fiber optic cables. The network 240 may also include additional hardware not shown such as routers, firewalls, switches, gateway computers and/or edge servers. It may be appreciated that FIG. 2 provides only an illustration of one implementation and does not imply any limitations with regard to the environments in which different embodiments may be implemented. Many modifications to the depicted environments may be made based on design and implementation requirements. Accordingly, the communication network 240 may represent any communication pathway between the various components of the networked computer environment 200.

Figure 3:
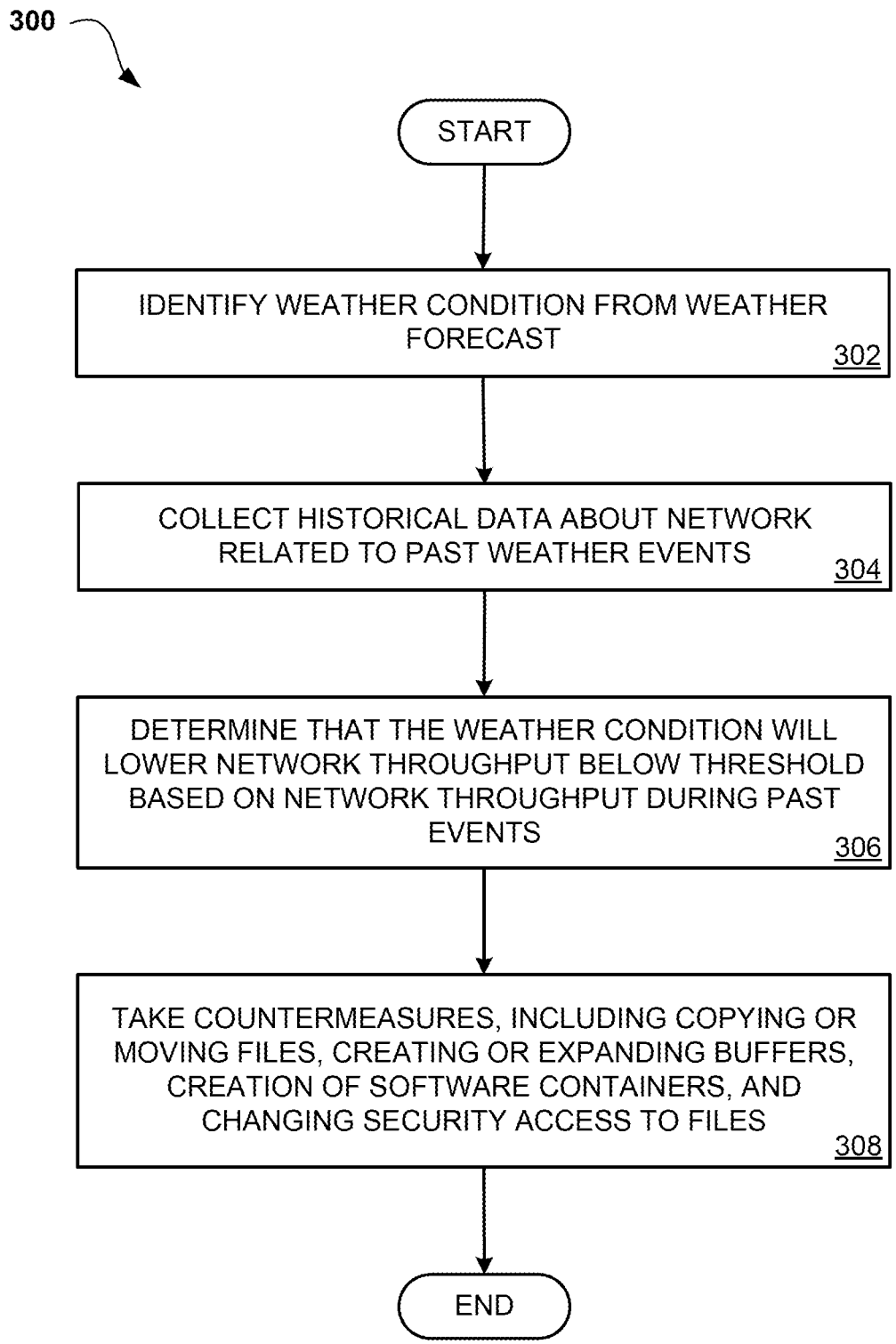
FIG. 3 depicts a flow chart diagram for a process to manage network throughput based on weather conditions according to an embodiment.

Referring to FIG. 3, an operational flowchart illustrating a process 300 to manage network throughput as a function of weather conditions is depicted according to at least one embodiment. At 302, individual weather conditions in a weather forecast that may be proximate to a network may be identified. It may be understood that the weather forecast may be collected using several different techniques. For example, the traffic prediction module 120 may be integrated with recognized weather data sources and computer models of the weather, including components such as APIs, satellite data, meteorological databases or similar sources may be accumulated and monitored and an alert may be generated that weather conditions in a certain geographic area may be trending such that network traffic in that geographic area may be adversely affected, or lowered by a significant amount. Alternatively, official authorities such as the National Weather Service in the United States may be monitored for bulletins and alerts such as watches or warnings, in which case a weather condition may be identified by a type, such as tornado, hurricane, rainstorm or snowstorm or extreme heat or cold. Identifying weather conditions by type may allow the traffic prediction module 120 to more easily correlate the weather condition to network throughput in step 304. Whatever the method, the identified weather condition may include a time period and a geographic area that may be affected by the identified weather condition. One of ordinary skill in the art may recognize that the time period may be expressed as a start and end time or may be a start time and duration to indicate when the weather may be in the state indicated by the weather condition in the forecast. For example, a posted Winter Storm Warning may indicate that the warning is to last from 8:00 AM to 2:00 PM on a specific date, in which case the same time period may be associated with the weather condition. However, another warning may only indicate a duration or certain dates that the condition may last, in which case the weather condition may use the dates as the time period for the weather condition. It is not necessary that the traffic prediction module 120 use information directly from an alert or database but rather may directly analyze weather data and create a preconfigured time period or may begin at a start time that may be determined in real time and continue until the weather condition may no longer be detected.

It may also be understood that there may be no limit to the size of a geographic area. In the interest of simplicity and to serve users with relevant data, weather conditions may be identified within recognized geographic areas, such as the New York City metropolitan area or perhaps specific counties in a state such as Los Angeles County in California or Hartford County in Connecticut. Such areas have defined boundaries, but geographic areas may also be identified by a center location with a radius or some other method to assure that users who may be affected by the identified weather conditions may be included in the network actions described herein. In addition to being described by the weather data, a geographic area may also be defined by a network that serves the area. For instance, a weather condition may be extremely isolated but there may be users that are not affected by the weather condition that may be connected to the same network and may therefore be subject to the network actions described herein.

At 304, historical data about the throughput of the network may be collected and correlated with weather data from a common time period in the geographic area. For example, all extreme weather events from the last ten years may be listed and the network throughput data during each of these extreme weather events may be checked to see if throughput was reduced by a significant amount during each of these time periods. For instance, the temperature may be tracked on a daily basis for the last 10 years and it may be determined that the network throughput in a location is extremely reduced whenever there is extreme hot or cold weather. This information may be used to form a prediction of the relationship between the temperature and network throughput such that action may be taken whenever the temperature is outside a predefined range. Alternatively, the network throughput analysis may yield patterns with respect to the relationship to the weather that may be used as training data in a machine learning classification model to classify the weather conditions that may be identified in 202. One of ordinary skill in the art will recognize that the historical data may be about an entire network in a geographic area, such as information about an entire neighborhood or city or town but may also be specific to one user since the traffic prediction module 120 may be loaded and running at each client device. The size of the network to be analyzed need not be limited.

It is also important to note at this stage that any real-time monitoring or analysis as mentioned herein that may include data that may personally identify a user requires the informed consent of all those people whose data may be captured for analysis. Consent may be obtained in real time or through a prior waiver or other process that informs a subject that sensitive personal data may be gathered through any means and that this data may be analyzed by any of the many algorithms, including natural language processing, that are mentioned below. A user may opt out of any portion of the real-time monitoring at any time.

At 306, it may be determined if the identified weather conditions may lower the network bandwidth, or throughput, enough to require remedial actions to be taken. In making this determination, the traffic prediction module 120 may make predictions of the effect of the weather condition on the network, such that weather conditions that may be predicted to lower the throughput below a predefined threshold may be classified as requiring attention and allowing the process to continue to 208, where measures may be taken to counteract the effects of the weather condition. If a weather condition were to be classified as not requiring attention, then no action would be taken.

In an embodiment, each weather condition may be classified according to whether the weather condition requires attention using a supervised machine learning classification model. One or more of the following machine learning algorithms may be used to classify the events: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include the historical weather data mentioned above in the context of past weather events, for instance network throughput levels may have dropped significantly during a past winter storm. Another example may be a seasonal pattern such as throughput dropping during extreme temperatures, either hot or cold. The classification results may be stored in a database so that the data is most current, and the output would always be up to date.

At 308, for a weather condition that has been identified, or classified, as requiring attention, countermeasures may be taken to proactively mitigate or eliminate the effect of the identified weather condition on the network throughput. One of ordinary skill in the art will recognize that the countermeasures may take several forms. For instance, a current set of resources may be altered to anticipate the adverse effect of the weather condition. As an example, caching algorithms related to a specific user may be modulated, including creation of additional containers for software applications, especially those applications that may be most sensitive to network traffic, e.g., Netflix or another file streaming service. The additional containers may allow local resources to be used in place of network or server resources, in anticipation of a more difficult communication environment between the local user and the remote server or network.

Another example of a countermeasure may be to increase the file buffer space and resulting time allotted to a user, anticipating that it may become more difficult to receive data from a central server during the time period of the weather condition. Such a file buffer may be created or expanded either on a server that may be determined to not be affected by the weather condition, such as a server in a location outside the geographic area of the weather condition or may also be created on the user computing device itself. Creating or expanding a file buffer in either of these locations may reduce the load on the computer network, as measured by the lowering of bandwidth or throughput, and bypass the effect of the weather condition.

In addition to creating or expanding file buffers, another countermeasure may be to copy or move a target file to an alternate location, such as the user computing device or another server outside the geographic area of the weather condition. For instance, if a storm is approaching the geographic area, one or more files containing certain entertainment programs may be downloaded that may be enjoyed at the user computing device during the storm. In determining which files to download and also how many files or a certain amount of data, the traffic prediction module may look to a user history, which may include prior network, computing device and software application usage to determine which content is preferred or may include a user profile where a user may have indicated specifically the preferred content. In this way, the network would not need to be accessed during the weather condition since the file would be local.

A further countermeasure may be proactively granting access to certain files to which a user may not normally have access for the duration of the weather condition. In such a case, it may be determined whether the user computing device is allowed to access certain predetermined content, which may include files that are not highly sensitive, as determined by an administrator or organization separate from the user. If this feature is enabled by the administrator or organization, then then the user computing device may be allowed to access the predetermined content during the time period of the weather condition.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
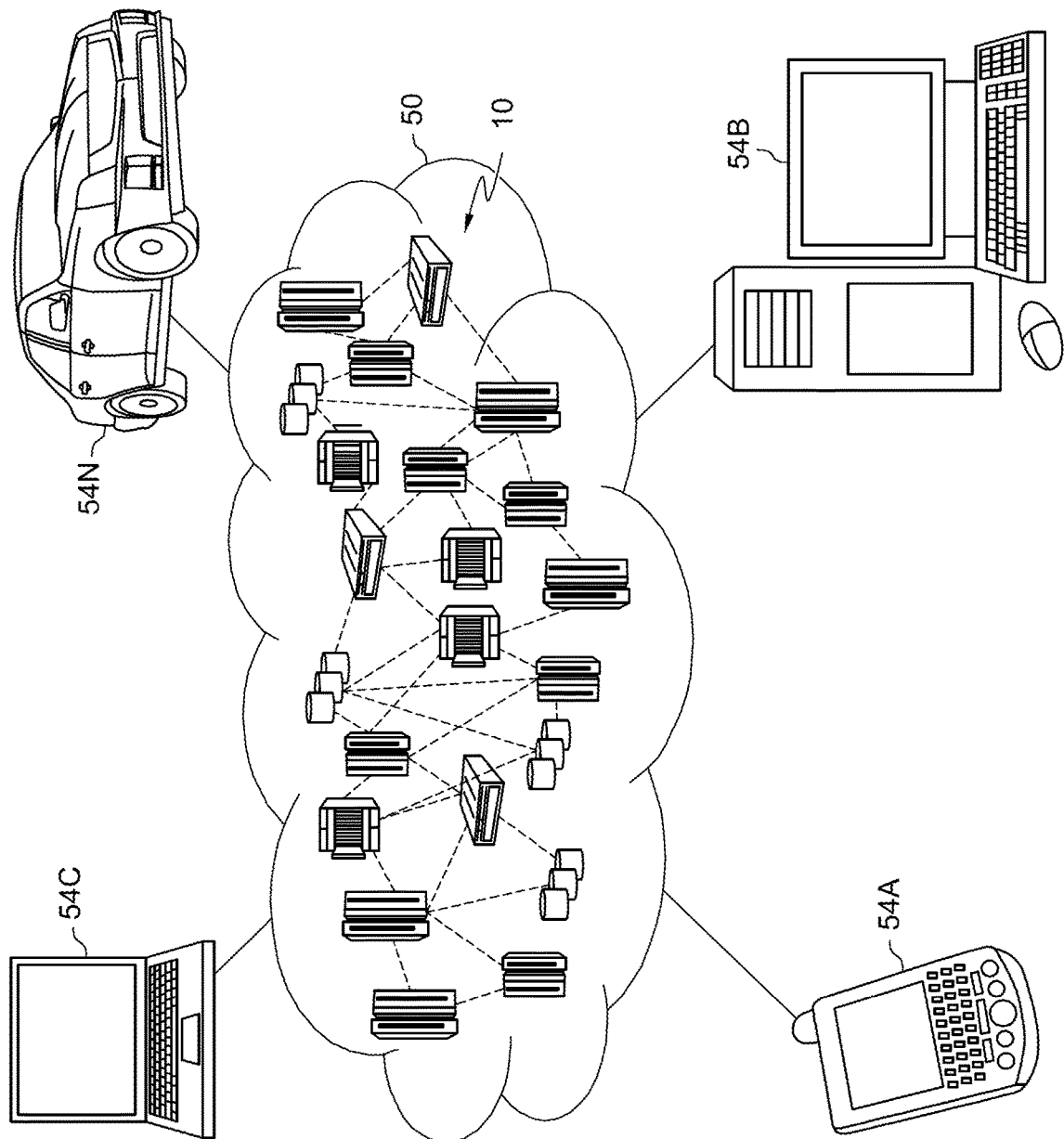
FIG. 4 depicts a cloud computing environment according to an embodiment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
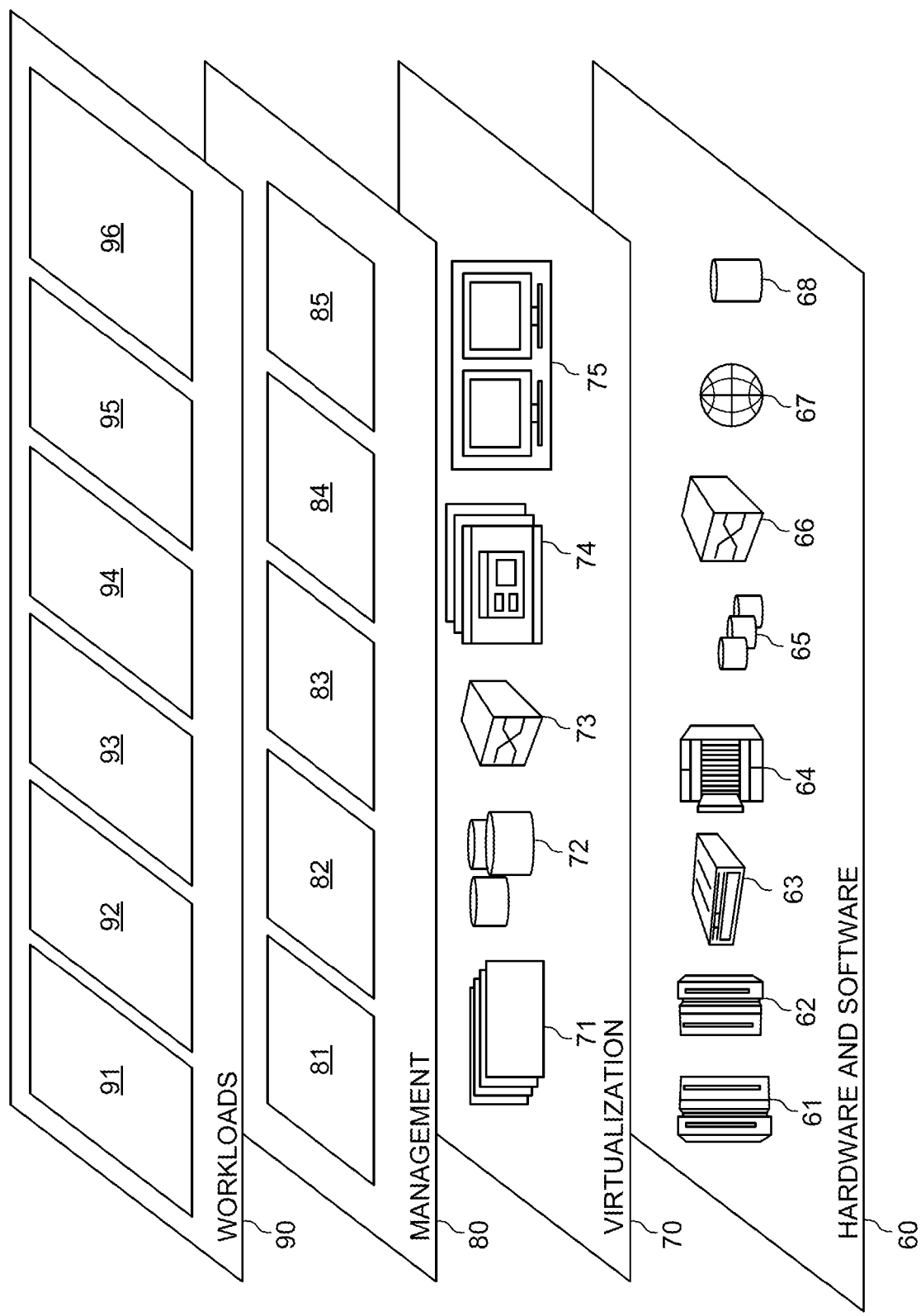
FIG. 5 depicts abstraction model layers according to an embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and managing network throughput based on weather conditions 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing throughput on a network based on weather conditions, the method comprising:
   identifying a weather condition from a weather forecast, wherein the weather condition includes a geographic area and a time period;

collecting historical data for the network, wherein the historical data correlates network performance and weather data in a common time period;

determining that the weather condition will lower network throughput below a threshold by predicting an effect of the weather condition on the network using the historical data; and performing a countermeasure on the network at a time prior to the time period of the weather condition, wherein the countermeasure is selected from a group consisting of: dynamically creating software application containers on a server, wherein the software application containers are accessed by a user computing device within the geographic area automatically copying a data file stored within the geographic area to a remote server outside the geographic area, automatically creating a file buffer on the remote server outside the geographic area, automatically copying a data file stored within the geographic area to the user computing device at the time prior to the time period of the weather condition, and automatically creating a local file buffer on the user computing device at the time prior to the time period of the weather condition.

2. The computer-implemented method of claim 1, wherein the performing the countermeasure on the network further comprises:

determining that the user computing device is not allowed to access predetermined content; and allowing the user computing device to access the predetermined content during the time period of the weather condition.

3. The computer-implemented method of claim 1, wherein the performing the countermeasure on the network further comprises:

identifying preferred content on the server from a user history; and copying the preferred content from the server to the user computing device at the time prior to the time period of the weather condition.

4. The computer-implemented method of claim 1, wherein the predicting the effect of the weather condition on the network uses a machine learning classification model.

5. A computer system for managing throughput on a network based on weather conditions, the computer system comprising:

one or more processors, one or more computer-readable memories, one or more computer-readable storage media, and program instructions stored on at least one of the one or more computer-readable storage media for execution by at least one of the one or more processors via at least one of the one or more computer-readable memories, wherein the computer system is capable of performing a method comprising:

identifying a weather condition from a weather forecast, wherein the weather condition includes a geographic area and a time period;

collecting historical data for the network, wherein the historical data correlates network performance and weather data in a common time period;

determining that the weather condition will lower network throughput below a threshold by predicting an effect of the weather condition on the network using the historical data; and performing a countermeasure on the network at a time prior to the time period of the weather condition, wherein the countermeasure is selected from a group consisting of: dynamically creating software application containers on a server, wherein the software application containers are accessed by a user computing device within the geographic area, automatically copying a data file stored within the geographic area to a remote server outside the geographic area, automatically creating a file buffer on the remote server outside the geographic area, automatically copying a data file stored within the geographic area to the user computing device at the time prior to the time period of the weather condition, and automatically creating a local file buffer on the user computing device at the time prior to the time period of the weather condition.

6. The computer system of claim 5, wherein the performing the countermeasure on the network further comprises:

determining that the user computing device is not allowed to access predetermined content; and allowing the user computing device to access the predetermined content during the time period of the weather condition.

7. The computer system of claim 5, wherein the performing the countermeasure on the network further comprises:

identifying preferred content on the server from a user history; and copying the preferred content from the server to the user computing device at the time prior to the time period of the weather condition.

8. The computer system of claim 5, wherein the predicting the effect of the weather condition on the network uses a machine learning classification model.

9. A computer program product for managing throughput on a network based on weather conditions, the computer program product comprising:

a computer readable storage medium having program instructions embodied therewith, the program instructions executable by a processor to cause the processor to perform a method comprising:

identifying a weather condition from a weather forecast, wherein the weather condition includes a geographic area and a time period;

collecting historical data for the network, wherein the historical data correlates network performance and weather data in a common time period;

determining that the weather condition will lower network throughput below a threshold by predicting an effect of the weather condition on the network using the historical data; and performing a countermeasure on the network at a time prior to the time period of the weather condition, wherein the countermeasure is selected from a group consisting of: dynamically creating software application containers on a server, wherein the software application containers are accessed by a user computing device within the geographic area, automatically copying a data file stored within the geographic area to a remote server outside the geographic area, automatically creating a file buffer on the remote server outside the geographic area, automatically copying a data file stored within the geographic area to the user computing device at the time prior to the time period of the weather condition, and automatically creating a local file buffer on the user computing device at the time prior to the time period of the weather condition.

10. The computer program product of claim 9, wherein the performing the countermeasure on the network further comprises:

determining whether the user computing device is allowed to access predetermined content;

allowing the user computing device to access the predetermined content during the time period of the weather condition when the user computing device is not allowed to access the predetermined content.

11. The computer program product of claim 9, wherein the performing the countermeasure on the network further comprises:

identifying preferred content on the server from a user history; and copying the preferred content from the server to the user computing device at the time prior to the time period of the weather condition.

12. The computer program product of claim 9, wherein the predicting the effect of the weather condition on the network uses a machine learning classification model.

* * * * *